F. G. KEYES & R. B. BROWNLEE.
ART OF PRODUCING TUNGSTEN POWDER.
APPLICATION FILED FEB. 17, 1915.
1,196,699.
Patented Aug. 29, 1916.
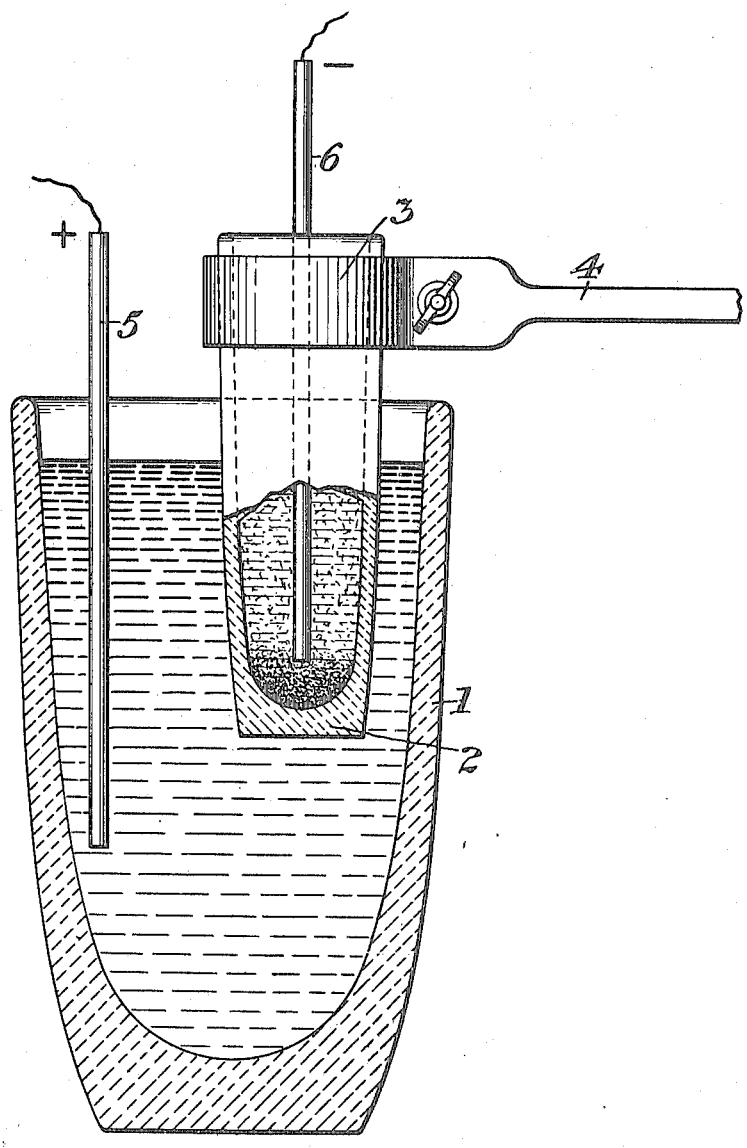

UNITED STATES PATENT OFFICE.

FREDERICK G. KEYES AND ROBERT B. BROWNLEE, OF HOBOKEN, NEW JERSEY, ASSIGNORS TO COOPER HEWITT ELECTRIC COMPANY, OF HOBOKEN, NEW JERSEY, A CORPORATION OF NEW JERSEY.

ART OF PRODUCING TUNGSTEN POWDER.

1,196,699.  Specification of Letters Patent.  Patented Aug. 29, 1916.

Application filed February 17, 1915. Serial No. 8,769.

*To all whom it may concern:*

Be it known that we, FREDERICK G. KEYES and ROBERT B. BROWNLEE, citizens of the United States, and residents of Hoboken, county of Hudson, State of New Jersey, have invented certain new and useful Improvements in the Art of Producing Tungsten Powder, of which the following is a specification.

In the present specification, we describe a novel method of producing tungsten powder, the details of which will be clearly understood by reference to the accompanying drawing which is mainly a vertical section through a crucible and its contents and a porous cup mounted within the crucible.

In the drawing 1 is a crucible which may be of platinum, for example, and 2 is a porous cup, say, of compressed and presintered tungsten powder which is held within the same by means of a clamp, 3, connected with a bracket, 4. In the crucible we place sodium tungstate ($Na_2WO_4$) in a fused state and the porous cup dips down to a considerable depth into the fused solution. The level of the liquid in the cup is substantially that of the liquid outside, owing to the porosity of the cup. An anode, 5, say, of platinum, extends into the liquid within the main crucible 1 and a cathode, 6, also of platinum, enters the cup 2 and plunges to a considerable depth below the surface of the liquid therein.

The operation is very simple. By the application of electric current to the anode and the cathode precipitation of powdered tungsten takes place within the porous cup, forming a mass of powdered material at the bottom with descending particles of powder above the mass. The powder then can be collected by removing the cup from its clamp and taking out the powder therefrom to be treated afterward to serve any desired purpose.

We claim as our invention:

The combination with a crucible, of fused sodium tungstate within the same, a porous cup dipping into the fused material and permitting the said material to enter the said cup to substantially the level of the material in the crucible, an anode extending into the crucible and the fused material therein and a cathode dipping into the material within the porous cup.

Signed at New York in the county of New York and State of New York this 16th day of February, A. D. 1915.

FREDERICK G. KEYES.
    ROBT. B. BROWNLEE.

Witnesses:
  GEORGE H. STOCKBRIDGE,
  THOS. H. BROWN.